United States Patent

Nakamura

[11] Patent Number: 5,908,666
[45] Date of Patent: Jun. 1, 1999

[54] PROCESS FOR PRODUCING LANGMUIR-BLODGETT FILM

[75] Inventor: Naoki Nakamura, Mishima, Japan

[73] Assignee: Toyota Jidosha Kabushiki Kaisha, Toyota, Japan

[21] Appl. No.: 08/933,937

[22] Filed: Sep. 19, 1997

Related U.S. Application Data

[63] Continuation of application No. 08/534,718, Sep. 27, 1995, abandoned.

[30] Foreign Application Priority Data

Sep. 30, 1994 [JP] Japan .................................. 6-237618

[51] Int. Cl.$^6$ .................................. B05D 1/36; B05D 7/00
[52] U.S. Cl. .................. 427/402; 427/434.3; 427/430.1; 427/8
[58] Field of Search ............................... 427/402, 434.3, 427/430.1, 8

[56] References Cited

U.S. PATENT DOCUMENTS

| | | | |
|---|---|---|---|
| 4,632,800 | 12/1986 | Barraud et al. | 264/298 |
| 4,722,856 | 2/1988 | Albrecht et al. | 427/402 |
| 5,143,745 | 9/1992 | Maganas et al. | 427/8 |

FOREIGN PATENT DOCUMENTS

| | | |
|---|---|---|
| 64-90058 | 4/1989 | Japan . |
| 2-90968 | 3/1990 | Japan . |
| 4-310268 | 11/1992 | Japan . |

*Primary Examiner*—Shrive Beck
*Assistant Examiner*—Bret Chen
*Attorney, Agent, or Firm*—Finnegan, Henderson, Farabow, Garrett & Dunner, L.L.P.

[57] ABSTRACT

A process for producing a Langmuir-Blodgett (LB) film, comprising the steps of: developing a monomolecular film of a film forming molecule on the surface of water and transferring the monomolecular film on a substrate, wherein a film forming solution containing the film forming molecule is dropped on the surface of water while allowing a water stream directed to the substrate to act on the surface of water or allowing an air stream directed to the substrate to act on a position in the vicinity of the surface of water; a condensed film of the film forming molecule is rapidly formed upon dropping of the film forming solution by taking advantage of the action of the water stream or air stream; and, after or simultaneously with the formation of the condensed film, the condensed film is transferred onto the substrate. This process can prevent the inclusion of impurities, enabling an LB film to be produced using a small apparatus without using any large developing trough. Further, a hybrid LB film can be formed by changing the film forming molecule dropped on the surface of water in the course of the formation of the LB film.

12 Claims, 10 Drawing Sheets

| | | | | | |
|---|---|---|---|---|---|
| A3 | B3 | C3 | D3 | E3 | F3 |
| A2 | B2 | C2 | D2 | E2 | F2 |
| A1 | B1 | C1 | D1 | E1 | F1 |
| A3 | B3 | C3 | D3 | E3 | F3 |
| A2 | B2 | C2 | D2 | E2 | F2 |
| A1 | B1 | C1 | D1 | E1 | F1 |

MEMBRANE PRODUCING DIRECTION →

Fig.10

PROCESS FOR PRODUCING LANGMUIR-BLODGETT FILM

This application is a continuation, of application Ser. No. 08/534,718, filed Sep. 27, 1995, now abandoned.

BACKGROUND OF THE INVENTION

1. Field of the Invention

The present invention relates to a process for producing a Langmuir-Blodgett (LB) film. More particularly, the present invention relates to a process for producing an LB film, which can produce an LB film using smaller equipment than the conventional production process and, at the same time, can easily produce an LB film formed of a plurality of dissimilar molecules.

2. Description of the Related Art

The Langmuir-Blodgett (LB) process has hitherto been widely used for the formation of organic ultrathin films. In the LB process, a thin film, formed on the surface of water, having a thickness corresponding to one molecule, that is, a monomolecular film, is developed under a certain surface pressure, and a solid substrate is moved up and down perpendicularly to the monomolecular film to transfer a condensed film in a close-packed state onto the substrate. The repetition of this procedure results in the build-up of an organic thin film on the substrate.

The conventional LB process has the problem that the surface pressure fluctuates, causing a fluctuation in the density or molecular orientation of the monomolecular film, so that the resultant organic thin film has a heterogeneous structure. In order to solve this problem, a film forming apparatus was proposed wherein, after the formation of a monomolecular film on the surface of water, the monomolecular film is compressed by a barrier to regulate the surface pressure (Japanese Unexamined Patent Publication (Kokai) No. 64-90058).

In the above conventional apparatus for producing an LB film, a monomolecular film is first developed on the surface of water and then compressed to form a condensed film. Therefore, the developing area before the compression had to be several tens of times as large as the area of the condensed film, unavoidably requiring a large apparatus. Further, the large developing area makes it difficult to maintain the orientation of the developed molecule. In addition, it causes an increased concern of impurities being included in the film.

Accordingly, an object of the present invention is to provide a process for producing an LB film, which can prevent the inclusion of impurities and produce an LB film using a small apparatus without using any large developing trough by dropping film forming molecules on the surface of water while compressing the resultant monomolecular film of a film forming molecule by taking advantage of a stream of a fluid to form a condensed film without developing the monomolecular film.

SUMMARY OF THE INVENTION

In order to attain the above and other objects of the present invention, according to a first aspect of the present invention, there is provided a process for producing a Langmuir-Blodgett (LB) film, comprising the steps of: developing a monomolecular film of a film forming molecule on the surface of water and transferring the monomolecular film on a substrate, wherein a film forming solution containing the film forming molecule is dropped on the surface of water while allowing a water stream directed to the substrate to act on the surface of water or allowing an air stream directed to the substrate to act on a portion in the vicinity of the surface of water; a condensed film of the film forming molecule is rapidly formed upon dropping of the film forming solution by taking advantage of the action of the water stream or air stream; and the condensed film is then transferred onto the substrate.

According to a second aspect of the present invention, there is provided a process for producing an LB film, wherein in the above process, upon the formation of the condensed film, the condensed film is successively transferred onto the substrate while continuing the formation of the condensed film.

According to a third aspect of the present invention, there is provided a process for producing an LB film, wherein in the above process, in the course of dropping the film forming solution containing the film forming molecule on the surface of water, the film forming solution to be dropped is changed to another film forming solution containing a different film forming molecule.

In the first aspect of the present invention, since a film forming solution is dropped on the surface of water while allowing a water stream or an air stream directed to the substrate to act on the surface of water, the dropped film forming solution is immediately compressed without developing a monomolecular film, thereby forming a condensed film. Therefore, the above problem associated with the development of a monomolecular film can be solved.

In the second aspect of the present invention, since the resultant condensed film is successively transferred onto the substrate while continuing the formation of the condensed film, the area of water on which the film forming solution is dropped may be further reduced, enabling the size of the apparatus to be further reduced.

In the third aspect of the present invention, since, unlike the prior art, the barrier against the monomolecular film is unnecessary, a film formed of molecules different from each other in the direction of compression can be continuously formed by suitably varying the film forming solution in the course of the formation of the film.

EXAMPLE 1

Figure 1:
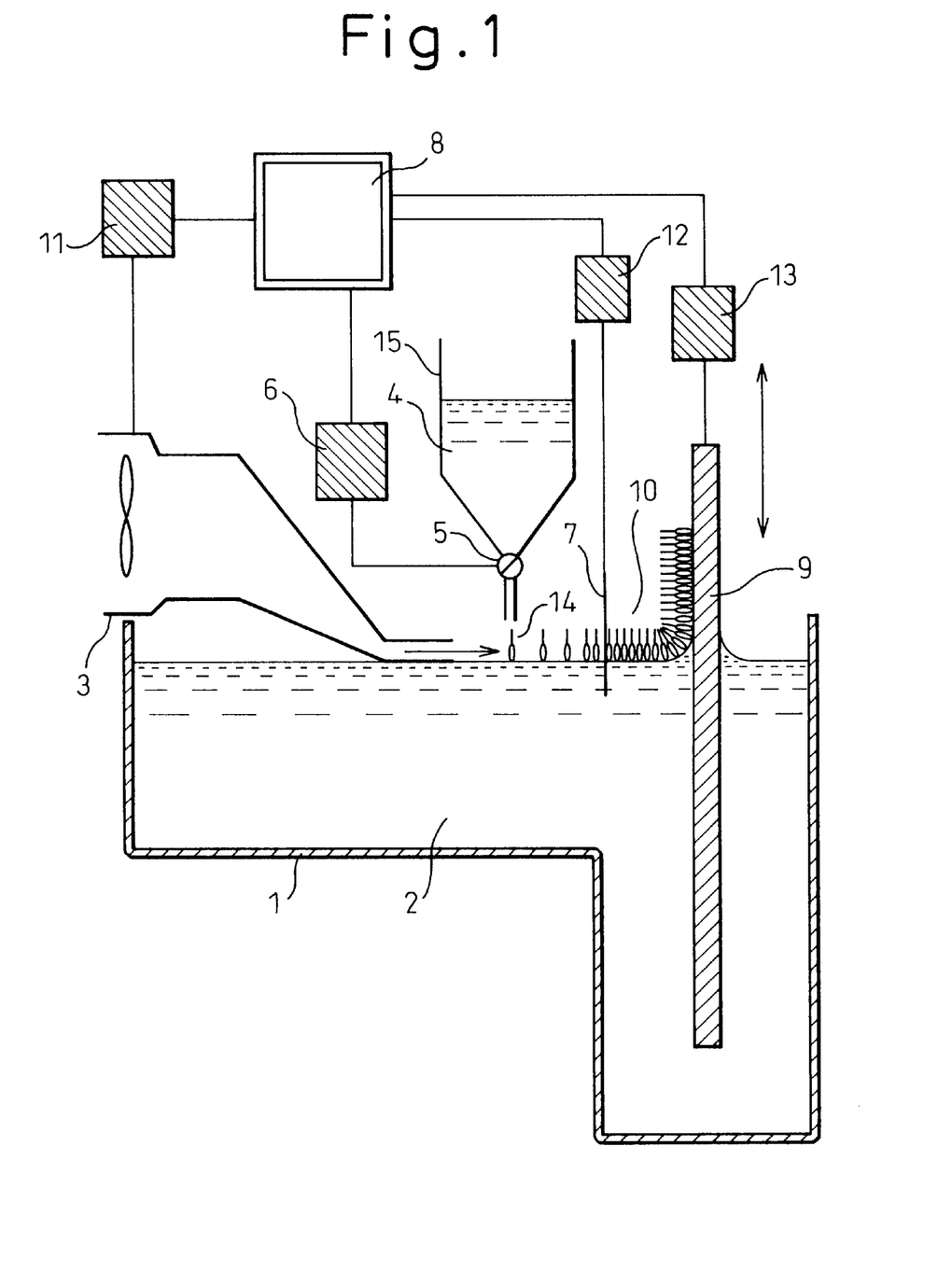
FIG. 1 is a schematic sectional side elevation showing an embodiment of an LB film production apparatus used in the process of the present invention.

FIG. 1 shows an apparatus used in the process for producing an LB film according to the present invention, wherein a film forming solution is compressed by an air stream. In this apparatus, a film forming molecule 14, contained in a film forming solution 4, dropped on the surface of water 2 is compressed toward a substrate 9 by the pressure of an air stream fed from an air fan 3. In the present invention, the film forming molecule 14 may be any amphiphatic compound used in the conventional LB process. The pressure of the air stream from the air fan 3 is regulated, so as to provide a surface pressure optimal for the formation of a homogeneous monomolecular condensed film 10, by means of an air fan controller 11 controlled by a computer 8 which monitors, through an A/D converter 12, signals from a surface pressure sensor 7 mounted on the surface of the water. Regarding the condensed film 10 formed in the vicinity of the substrate 9, an X film (a film wherein hydrophobic groups of the molecule face the substrate), a Y film (a film wherein hydrophobic and hydrophilic groups of the molecule alternate with each other), or a Z film (wherein hydrophilic groups of the molecule face the substrate) may be formed by allowing the substrate 9 to ascend or descend by means of a substrate drive unit 13 while forming the condensed film. In order to form an LB film having a better quality, the substrate drive unit 13 is preferably connected to the computer 8 to control the ascent/descent of the substrate. Further, it is also preferred to control, through a valve drive unit 6 connected to the computer 8, a valve 5 for dropping the film forming solution 4. Thus, the air stream on the surface of water, the amount of the film forming solution dropped, and the ascent or descent rate of the substrate are controlled as a whole, enabling an LB film to be formed under optimal conditions. The position of a device 15 for dropping the film forming solution 4 is not particularly limited. However, if the distance of the device 15 from the substrate is large, the area of the trough should be increased and, further, the dropped film forming molecule 14 should be made to travel a long distance. The provision of the device 15 for dropping a film forming solution in the vicinity of the substrate can minimize the trough area, enabling the size of the whole apparatus shown in FIG. 1 to be reduced. Further, since the travel distance of the film forming molecule is short, the inclusion of impurities can be prevented and, at the same time, the creation of domain cracking can be minimized.

EXAMPLE 2

Figure 2:
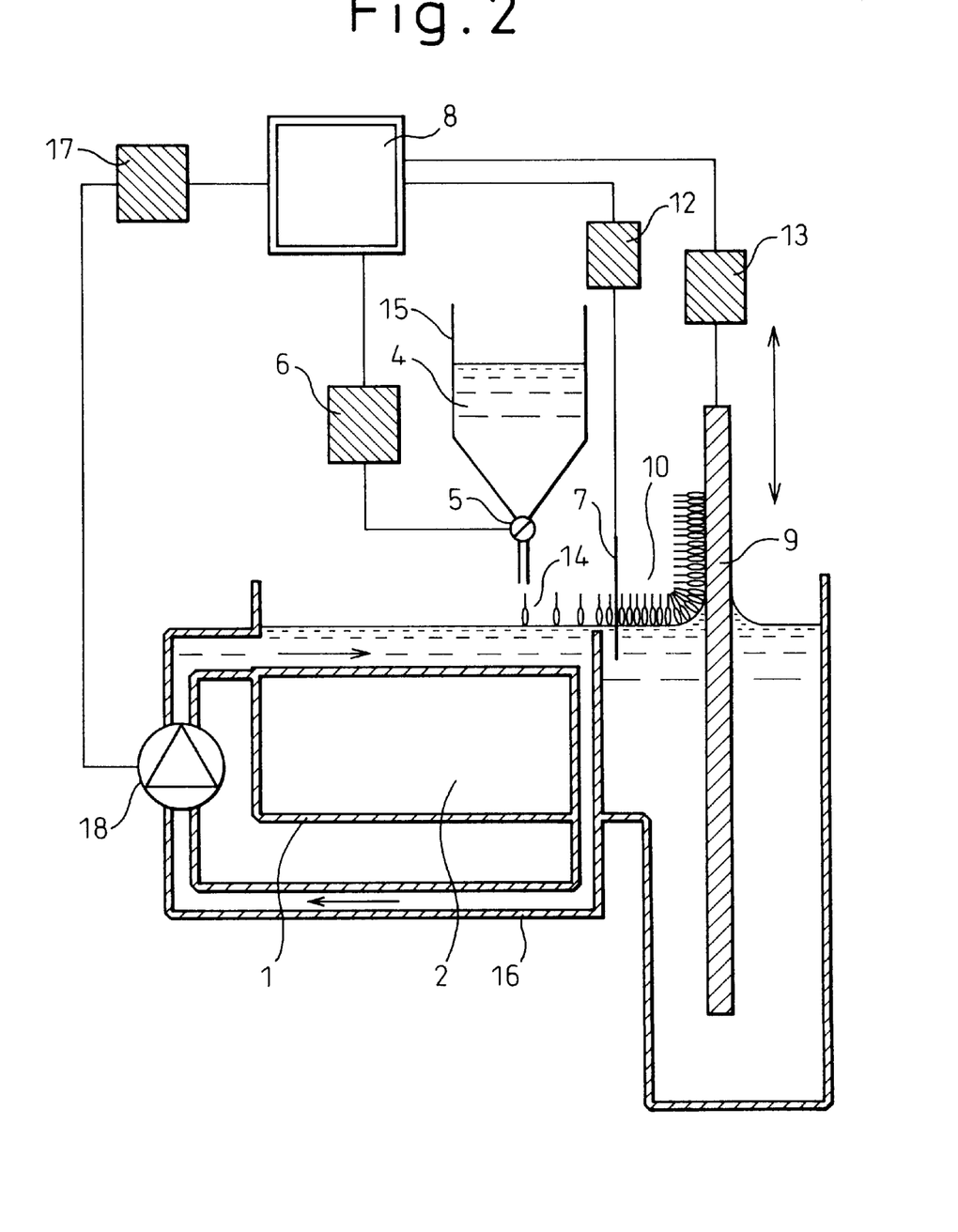
FIG. 2 is a schematic sectional side elevation showing another embodiment of an LB film production apparatus used in the process of the present invention.

FIG. 2 shows an apparatus used in the process for producing an LB film according to the present invention, wherein a film forming solution is compressed by a water stream. This apparatus is the same as the apparatus shown in FIG. 1, except that a circulating pipe 16 provided with a pump 18 is used instead of the air fan 3 in the apparatus of FIG. 1. The film forming molecule 14 dropped on the surface of water is compressed toward the substrate 9 by a water stream formed by means of a water jet pump 18. The water stream is regulated, so as to provide a surface pressure optimal for the formation of a homogeneous monomolecular condensed film 10, by means of a water stream controller 17 controlled by a computer 8 which monitors signals from a surface pressure sensor 7 mounted on the surface of water. The condensed film 10 formed in the vicinity of the substrate 9 is transferred onto the substrate 9 in the same manner as in Example 1.

EXAMPLE 3

Figure 3:
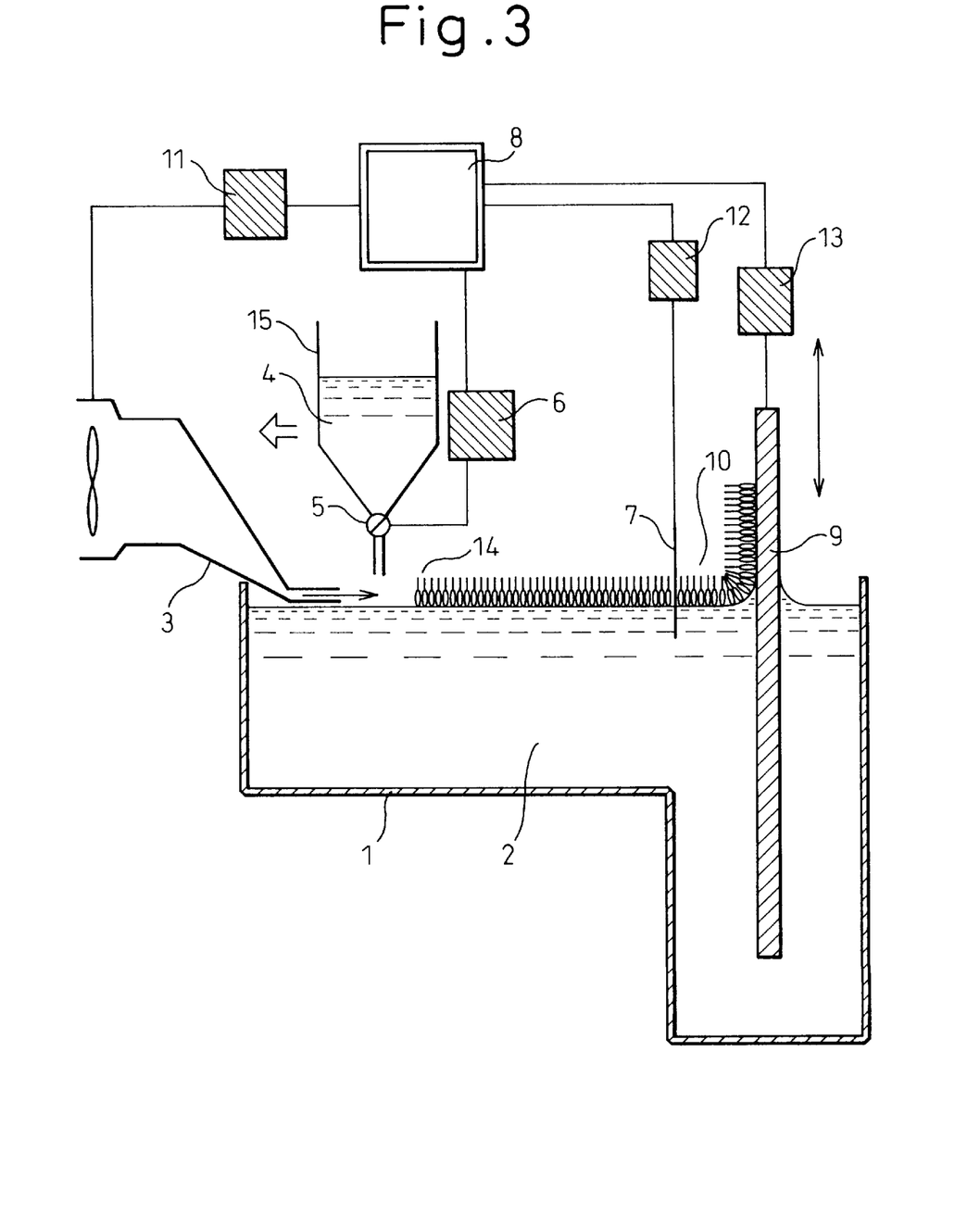
FIG. 3 is a schematic sectional side elevation showing a further embodiment of an LB film production apparatus used in the process of the present invention.

The process described in this example is basically the same as in Example 1, except that, as shown in FIG. 3, a film forming molecule 14 is dropped while moving the device 15, for dropping a film forming solution, in a direction opposite to the substrate 9 to form, on the water surface, a condensed film 10 which is then transferred onto the substrate 9. In this process as well, moving the device 15 for dropping a film forming solution can minimize the travel distance of the dropped film forming molecule 14, preventing the inclusion of impurities. Further, in this process, since the film forming molecule 14 is compressed immediately after dropping of the film forming solution, the monomolecular film need not be widely developed. Therefore, the trough area may be substantially the same as the area of the substrate 9, and, hence, the apparatus used may be much smaller than the apparatus used in the conventional process.

EXAMPLE 4

Figure 4:
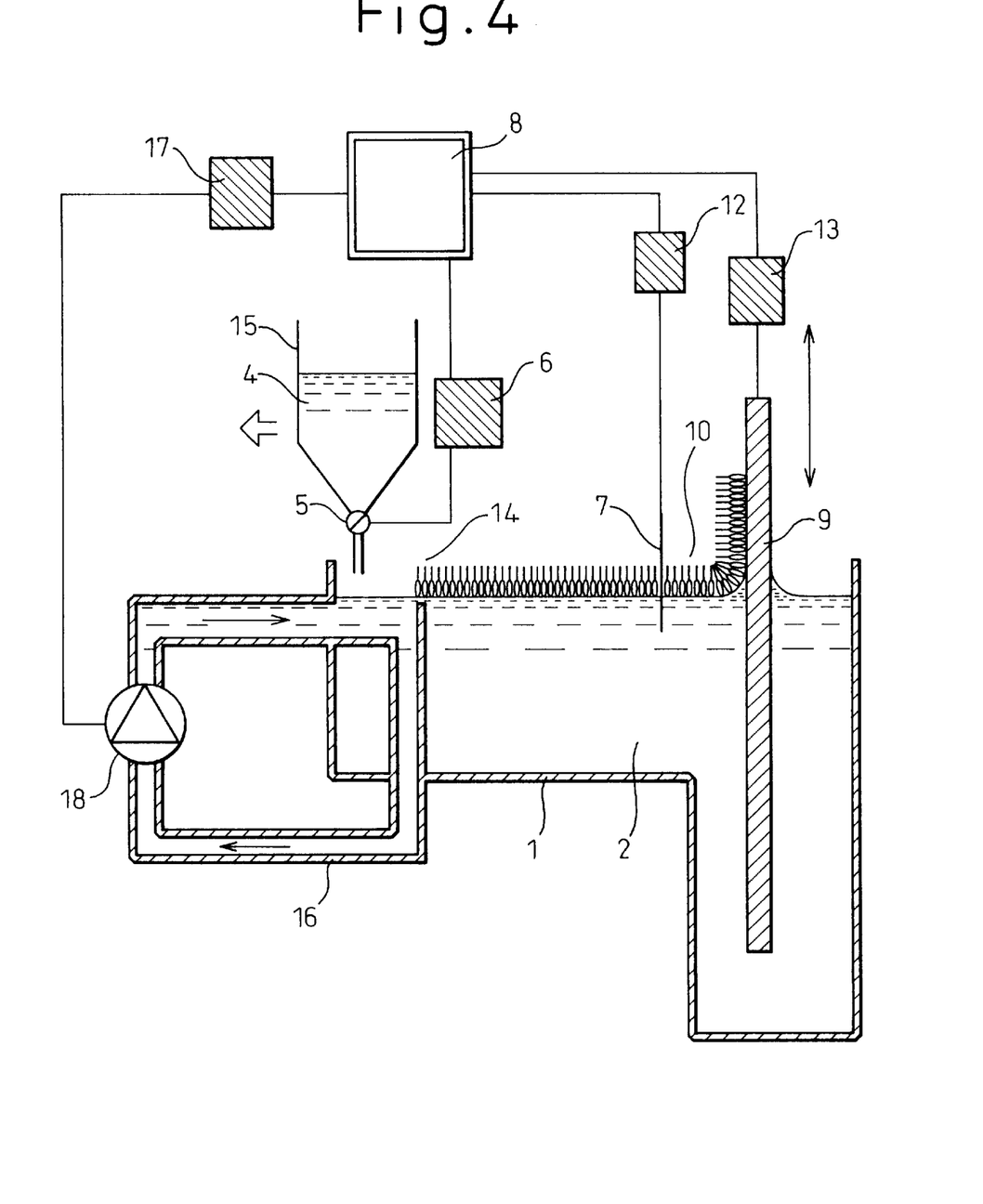
FIG. 4 is a schematic sectional side elevation showing a further embodiment of an LB film production apparatus used in the process of the present invention.

The process described in this example is basically the same as in Example 2, except that, as shown in FIG. 4, a film forming molecule 14 is dropped while moving the device 15, for dropping a film forming solution, in a direction opposite to the substrate 9 to form, on the water surface, a condensed film 10 which is then transferred onto the substrate 9. In this process as well, the size of the apparatus can be reduced by virtue of the same features as described in Example 3.

EXAMPLE 5

Figure 5:
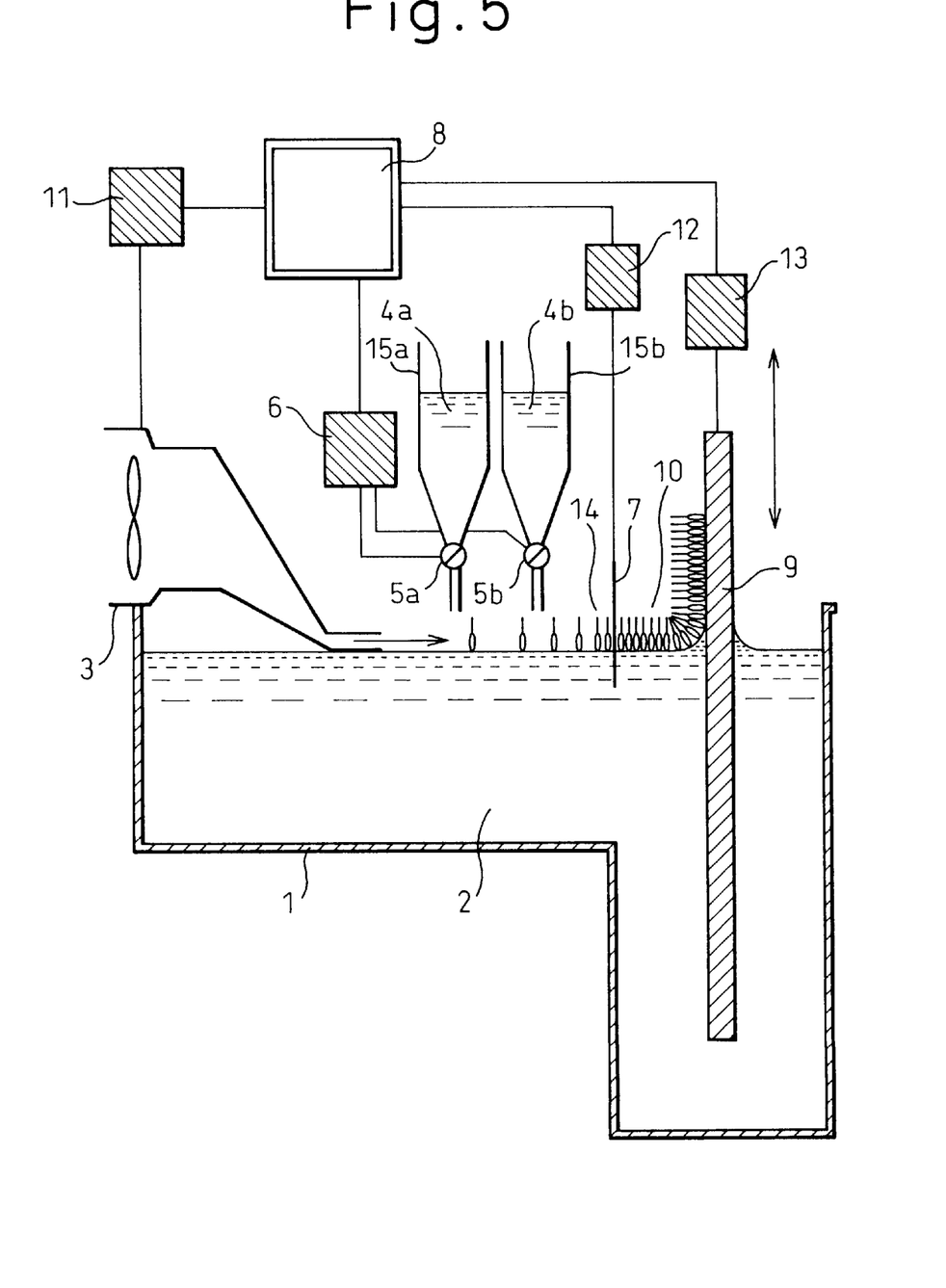
FIG. 5 is a schematic sectional side elevation showing a further embodiment of an LB film production apparatus used in the process of the present invention.
Figure 6:
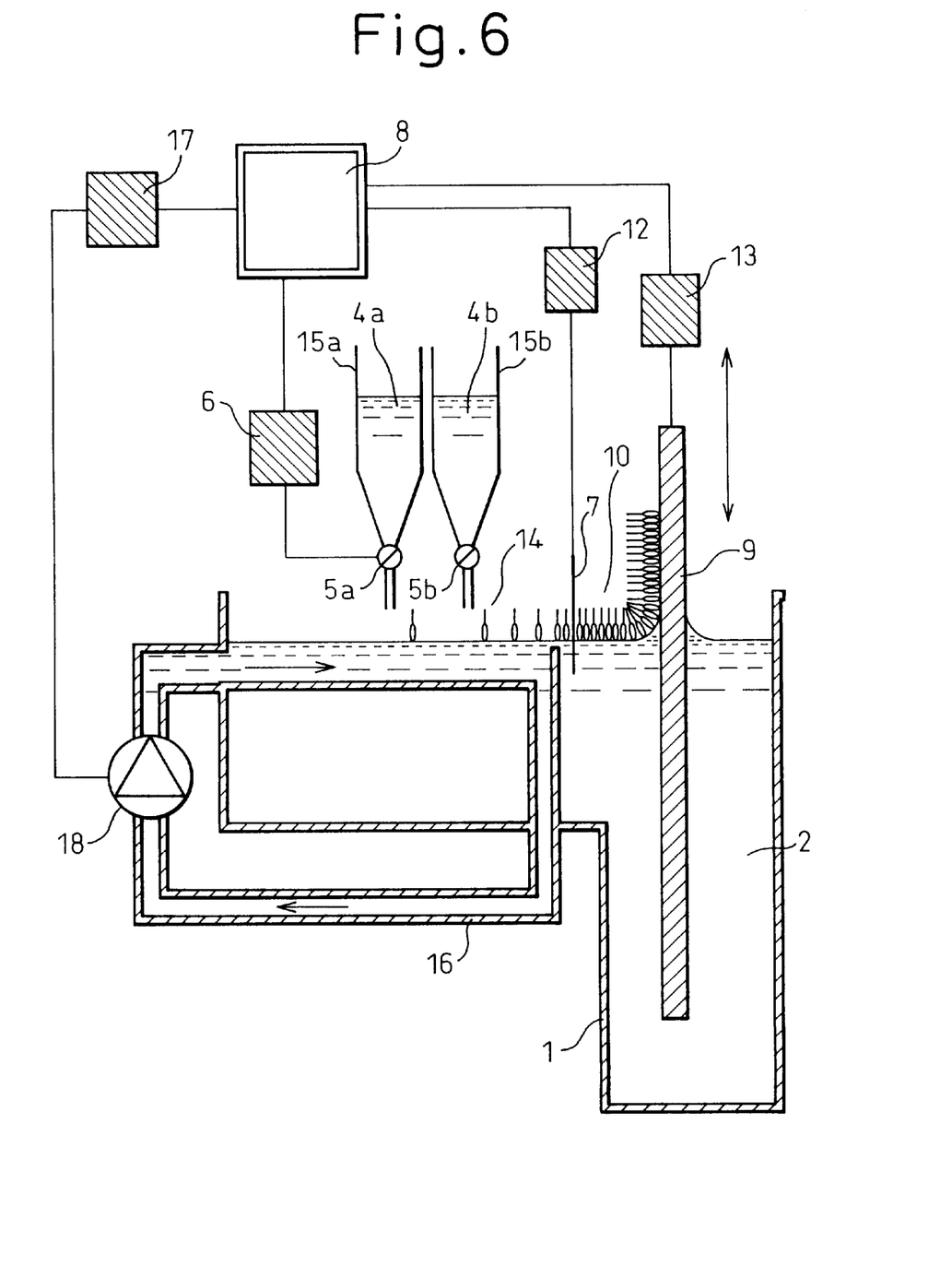
FIG. 6 is a schematic sectional side elevation showing a further embodiment of an LB film production apparatus used in the process of the present invention.
Figure 7A:
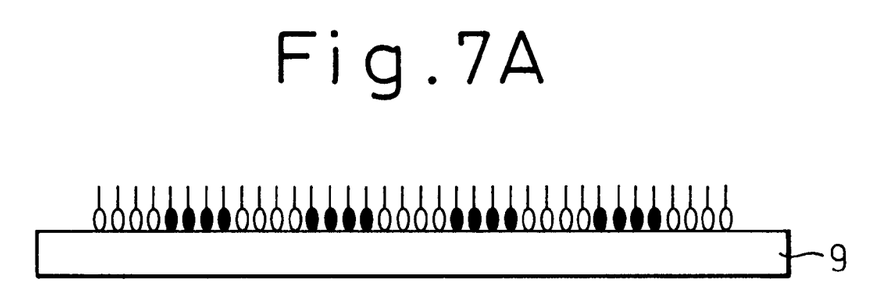
FIGS. 7A, 7B, and 7C are schematic diagrams showing constructions of LB films formed according to the process of the present invention.
Figure 7B:
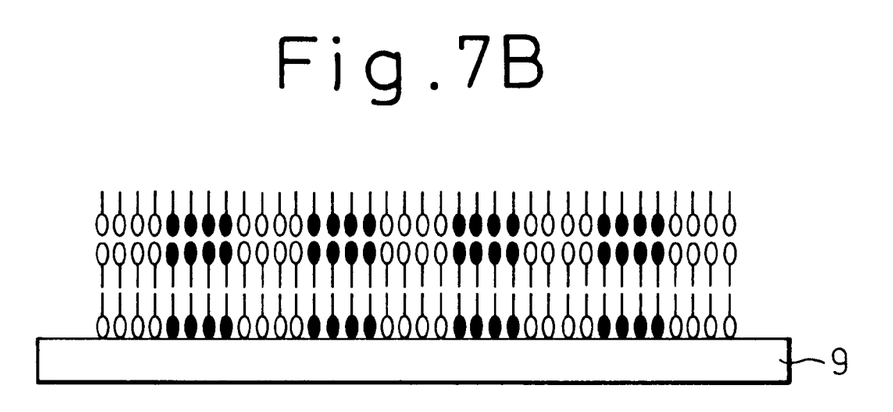
Figure 7C:
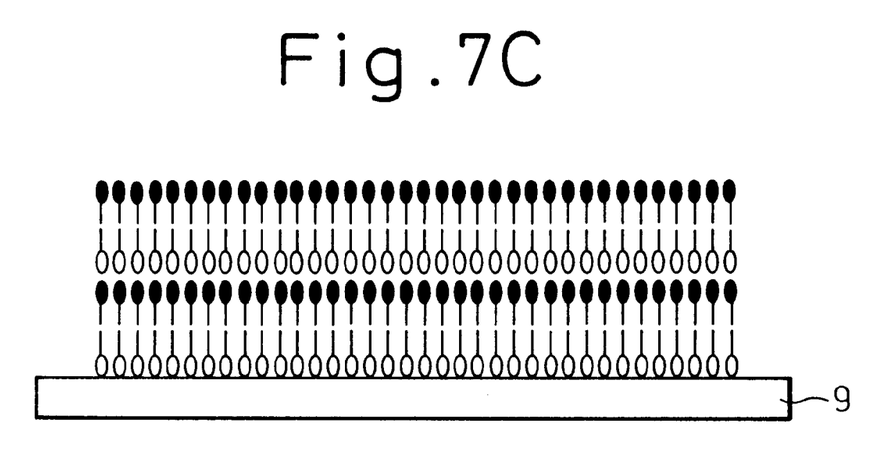

The apparatus used in this example is the same as that used in Example 1 or 2, except that, as shown in FIG. 5 or 6, a plurality of devices 15a and 15b for dropping a film forming solution are provided. The devices 15a and 15b for dropping a film forming solution respectively contain dissimilar film forming solutions 4a and 4b. A hybrid LB film can be easily formed by forming a condensed film of dissimilar film forming molecules through on-off control of valves 5a and 5b and transferring the condensed film onto the substrate. Examples of the hybrid LB film formed in this example are shown in FIG. 7. LB films as shown in FIGS. 7A and 7B can be formed by alternately dropping dissimilar film forming solutions. Further, an LB film as shown in FIG. 7C can be formed by dropping a film forming solution to form one monomolecular layer, dropping a different film forming solution to build up a different monomolecular layer on the above monomolecular layer, and repeating the above procedure.

EXAMPLE 6

Figure 8:
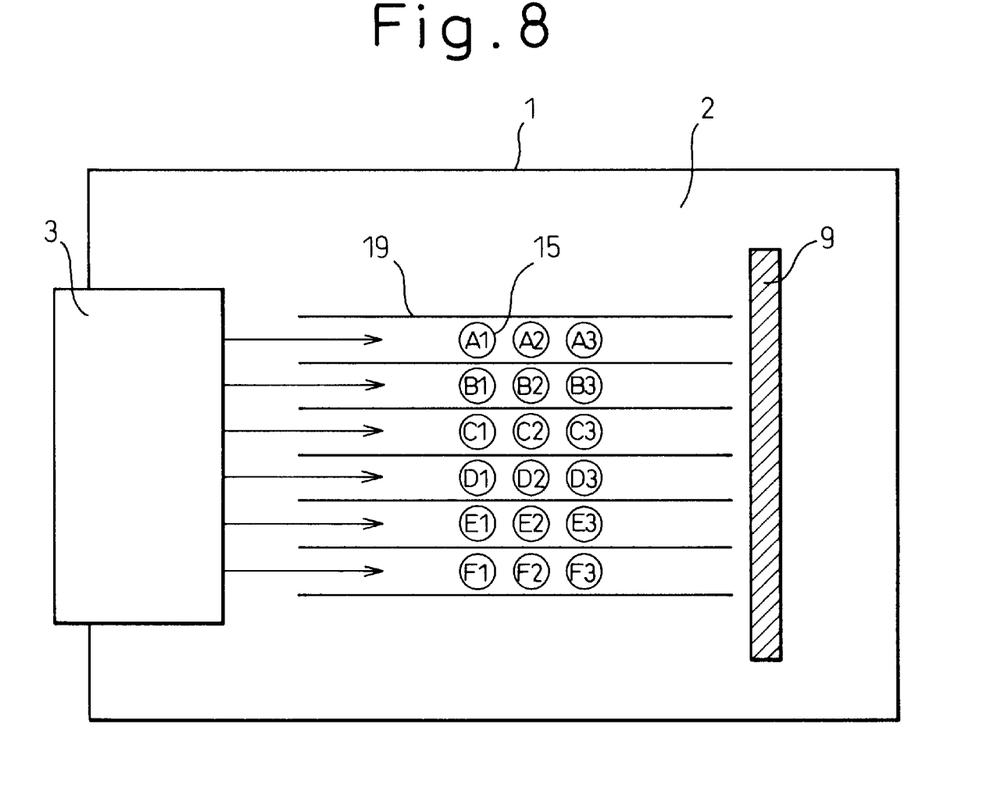
FIG. 8 is a schematic diagram showing an embodiment of an LB film production apparatus, used in the process of the present invention, as viewed from the top thereof.
Figure 9:
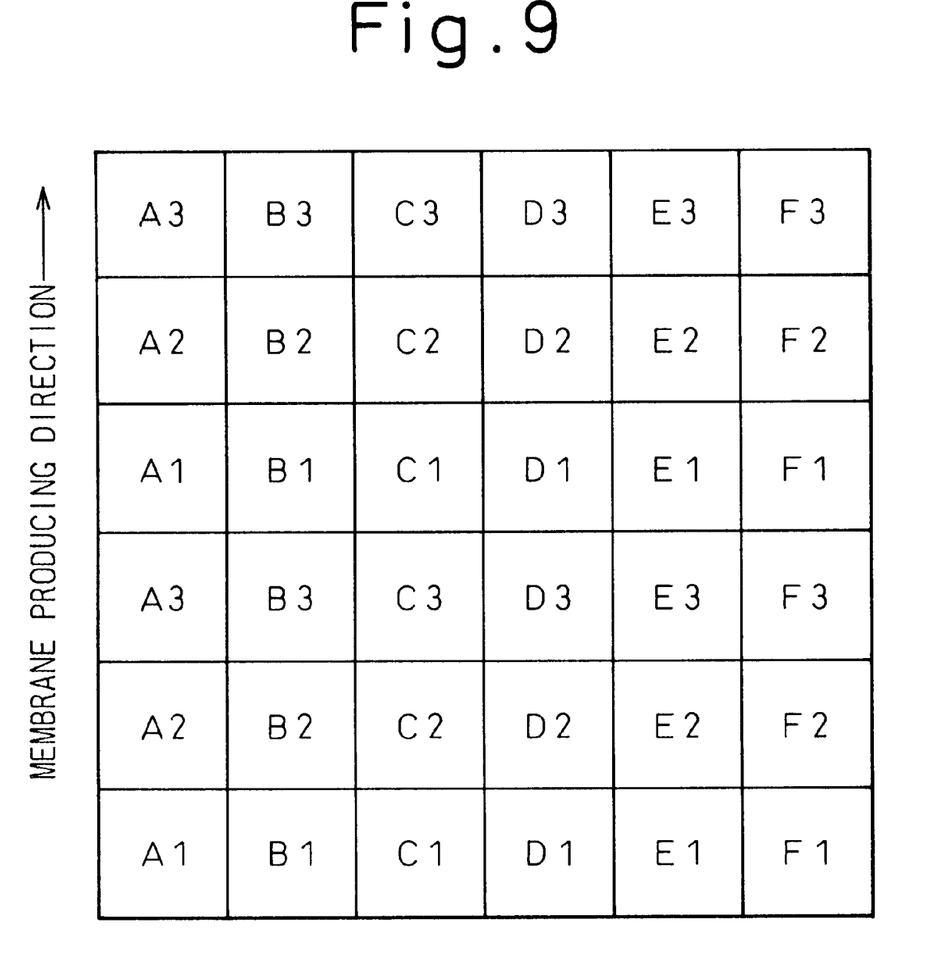
FIG. 9 is a schematic diagram showing an embodiment of an LB film produced using the apparatus shown in FIG. 8.
Figure 10:
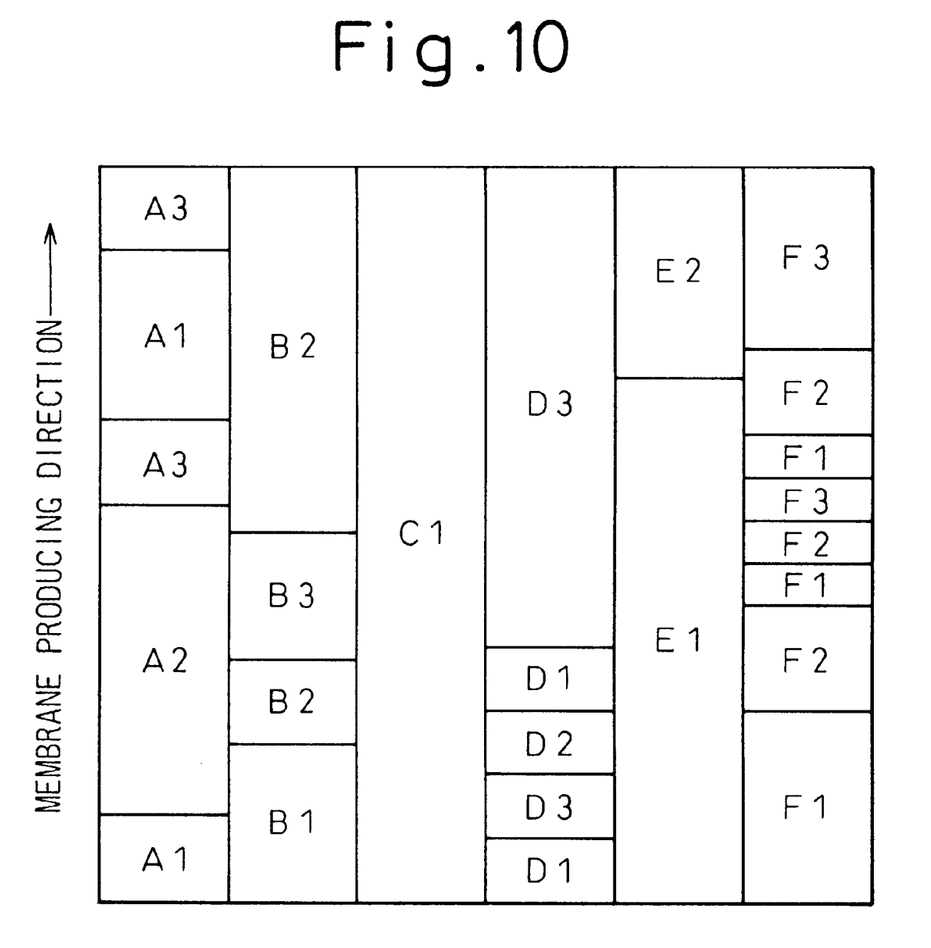
FIG. 10 is a schematic diagram showing another embodiment of an LB film produced using the apparatus shown in FIG. 8.

FIG. 8 shows an apparatus, used in this example, as viewed from the top thereof. This apparatus is provided with a number of devices 15 for dropping a film forming solution. The devices for dropping a film forming solution respectively contain dissimilar film forming solutions (A1 to F3), and a partition plate 19 is provided in order to avoid mixing of adjacent condensed films. The hybrid LB films formed in this example are shown in FIGS. 9 and 10. FIG. 9 shows an LB film formed by alternately dropping film forming solutions, A1 to F1, A2 to F2, and A3 to F3 in synchronism with one another. Further, an LB film, having a further complicated construction, as shown in FIG. 10 can be formed by randomly dropping the film forming solutions.

The hybrid LB films formed of dissimilar molecules, by virtue of their anisotropic structure, are promising candidates for elements which can create novel functions and properties (for example, anisotropy in electric conductivity, electroluminescence, optical anisotropy, photochromism, and nonlinear optical effects). For example, in the production of nonlinear optical elements, according to the constructions as shown in FIGS. 7A and 7B, periodic incorporation of molecules having a high degree of orientation into molecules having a high degree of polarization but a low degree of orientation can improve the orientation, resulting in markedly improved nonlinear optical properties. The LB film as shown in FIG. 7C can be produced also by the conventional process. In the conventional process, however, each time one layer is formed, the barrier should be returned to the original position followed by dropping of the film forming solution and the development and compression of the resultant monomolecular film. By contrast, according to the process of the present invention, dissimilar film forming molecules can be dropped by on-off control of a plurality of devices for dropping a film forming solution, enabling the film forming time to be markedly shortened.

I claim:

1. A process for producing a Langmuir-Blodgett (LB) film, comprising the steps of:

developing a monomolecular film of a film forming molecule on the surface of water and transferring the monomolecular film onto a substrate, wherein said developing step comprises dropping a film forming solution containing the film forming molecule on the surface of water while allowing either a water stream or an air stream directed to the substrate to act on said film forming molecule on the surface of the water;

forming a condensed film of the film forming molecule upon dropping of the film forming solution between the water stream or air stream and said substrate.

2. The process according to claim 1, wherein during the process of producing the Langmuir-Blodgett film of the film forming solution containing a film forming molecule, the film forming solution to be dropped is changed to another film forming solution containing a different film forming molecule.

3. The process according to claim 2, wherein the film forming solutions are dropped from a plurality of respective devices for dropping a film forming solution, the dropping devices respectively containing film forming solutions different from each other in the film forming molecule, and the film forming solutions are alternately dropped from the respective dropping devices.

4. The process according to claim 1, wherein the air stream is generated by means of an air fan and the pressure of the air stream from the air fan is detected by a surface pressure sensor, provided on the surface of water, interlocked with a computer which serves to control the pressure of the air stream so as to form an optimal condensed film of a monomolecule.

5. The process according to claim 1, wherein the film forming solution is dropped while moving a device for dropping the film forming solution containing a film forming molecule, thereby minimizing the distance of movement of the film forming molecule on the surface of water by the action of the water stream or the air stream.

6. The process according to claim 1, wherein water on which the film forming solution is dropped is recirculated by means of a water jet pump to generate the water stream, the velocity of which is detected by a surface pressure sensor, provided on the surface of water, interlocked with a computer which serves to control the velocity of the water stream so as to form an optimal condensed film of a monomolecule.

7. A process for producing a Langmuir-Blodgett (LB) film, comprising the steps of:

developing a monomolecular film of a film forming molecule on the surface of water and transferring the monomolecular film on a substrate, wherein said developing step comprises dropping a film forming solution containing the film forming molecule on the surface of water while allowing a water stream or an air stream directed to the substrate to act on said film forming molecule on the surface of the water;

forming a condensed film of the firm forming molecule upon dropping of the film forming solution between the water or air stream and said substrate; and wherein the condensed film successively onto the substrate while simultaneously continuing the formation of the condensed film.

8. The process according to claim 7, wherein during the process of producing the Langmuir-Blodgett film of the film forming solution containing a film forming molecule, the film forming solution to be dropped is changed to another film solution containing a different film forming molecule.

9. The process according to claim 8, wherein the film forming solutions are dropped from a plurality of respective devices for dropping a film forming solution, the dropping devices respectively containing film forming solutions different from each other in the film forming molecule, and the film forming solutions are alternately dropped from the respective dropping devices.

10. The process according to claim 7, wherein the air stream is generated by means of an air fan and the pressure of the air stream from the air fan is detected by a surface pressure sensor, provided on the surface of water, interlocked with a computer which serves to control the pressure of the air stream so as to form an optimal condensed film of a monomolecule.

11. The process according to claim 7, wherein the film forming solution containing a film forming molecule is dropped on the surface of water in the vicinity of the substrate.

12. The process according to claim 7, wherein water on which the film forming solution is dropped is recirculated by means of a water jet pump to generate the water stream, the velocity of which is detected by a surface pressure sensor, provided on the surface of water, interlocked with a computer which serves to control the velocity of the water stream so as to form an optimal condensed film of a monomolecule.

* * * * *

UNITED STATES PATENT AND TRADEMARK OFFICE
CERTIFICATE OF CORRECTION

PATENT NO.: 5,908,666

DATED: June 1, 1999

INVENTOR(S): Naoki NAKAMURA

It is certified that an error appears in the above-identified patent and that said Letters Patent is hereby corrected as shown below:

In Column 6, line 24, delete "firm" and insert therefor --film--;

line 27, after "film" insert --is--;

line 27, after "successively" insert --transferred--.

Signed and Sealed this

Ninth Day of November, 1999

*Attest:*

Q. TODD DICKINSON

*Attesting Officer*  Acting Commissioner of Patents and Trademarks